Figure 6:
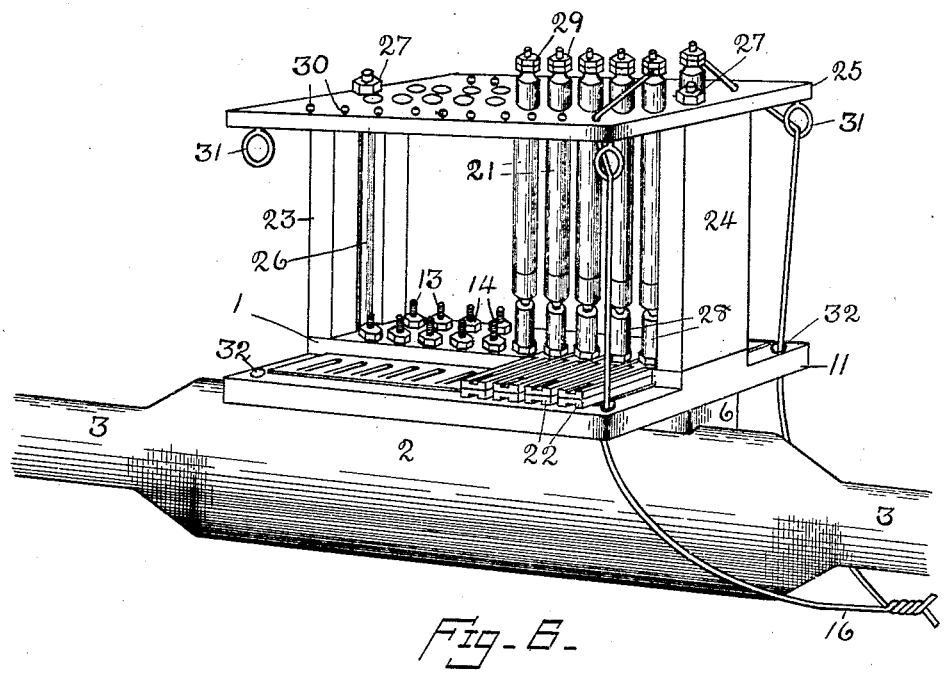

R. S. DONALDSON & V. E. FURNAS.
SLEEVE CABLE TERMINAL.
APPLICATION FILED AUG. 3, 1908.
970,194.
Patented Sept. 13, 1910.
4 SHEETS—SHEET 1.
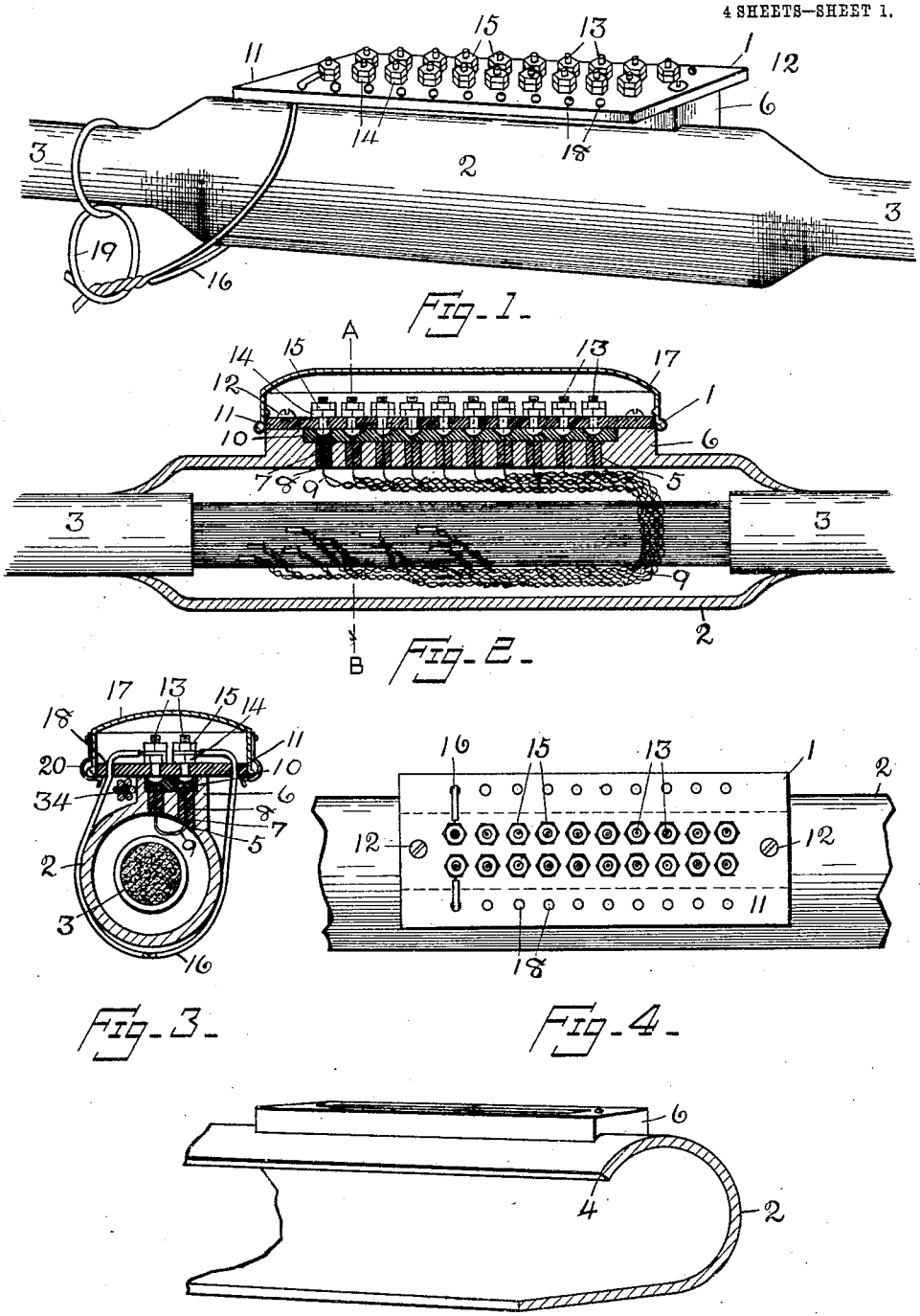

R. S. DONALDSON & V. E. FURNAS.
SLEEVE CABLE TERMINAL.
APPLICATION FILED AUG. 3, 1908.

970,194.

Patented Sept. 13, 1910.
4 SHEETS—SHEET 2.

WITNESSES:
John E. Heller,
Minnie C. Rollwage.

INVENTORS.
Robert S. Donaldson
Vincent E. Furnas,
BY
Abraham Knobel, ATTORNEY.

THE NORRIS PETERS CO., WASHINGTON, D. C.

R. S. DONALDSON & V. E. FURNAS.
SLEEVE CABLE TERMINAL.
APPLICATION FILED AUG. 3, 1908.
970,194.
Patented Sept. 13, 1910.
4 SHEETS—SHEET 3.
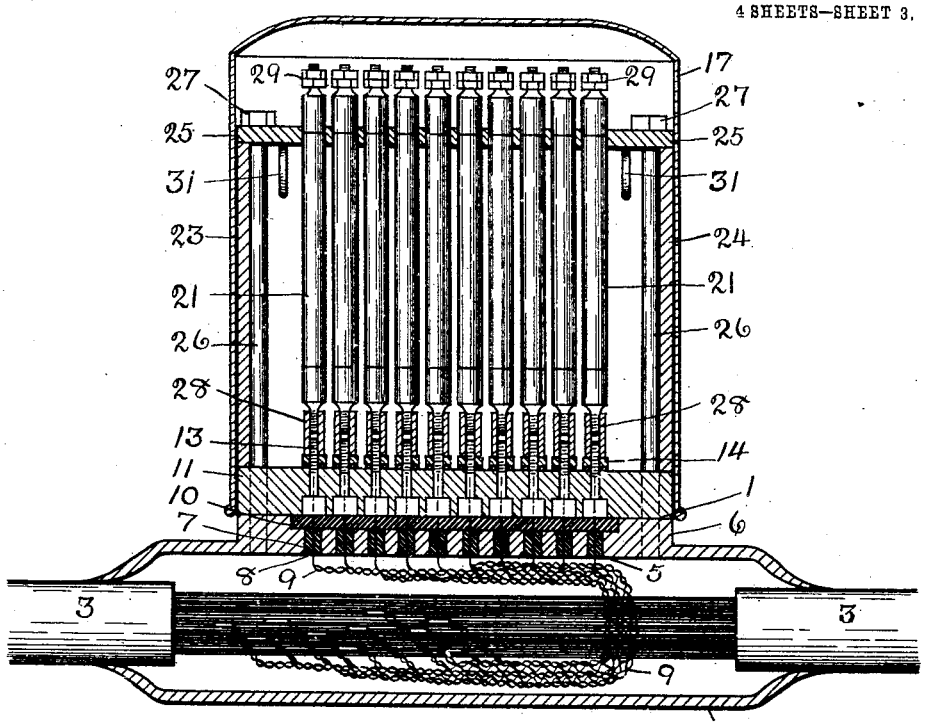
Fig-8-
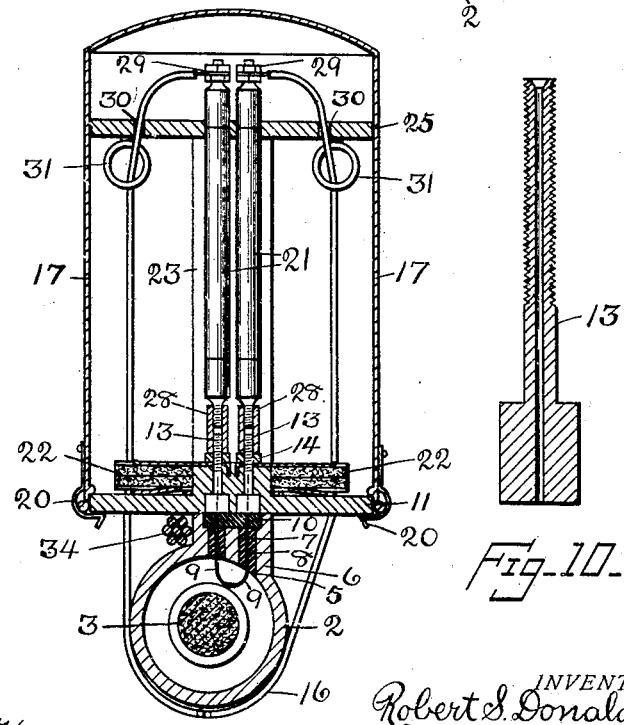
Fig-9-
Fig-10-
WITNESSES:
John E. Heller,
Minnie C. Rollwage.
INVENTORS
Robert S. Donaldson,
Vincent E. Furnas,
By Abraham Knobel ATTORNEY.
THE NORRIS PETERS CO., WASHINGTON, D. C.

R. S. DONALDSON & V. E. FURNAS.
SLEEVE CABLE TERMINAL.
APPLICATION FILED AUG. 3, 1908.
970,194.
Patented Sept. 13, 1910.
4 SHEETS—SHEET 4.
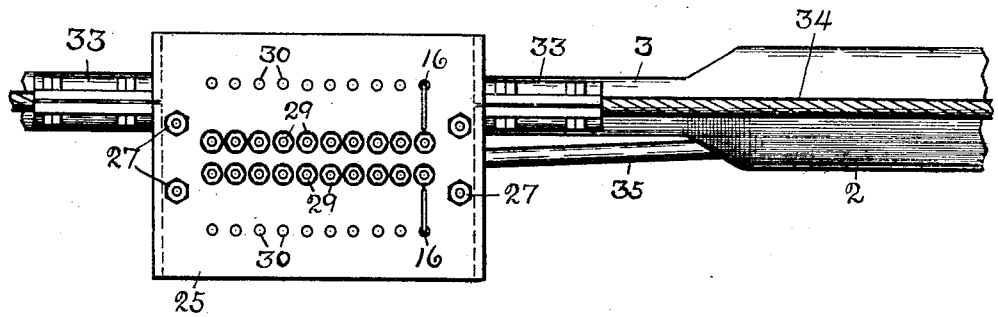
Fig. 11.
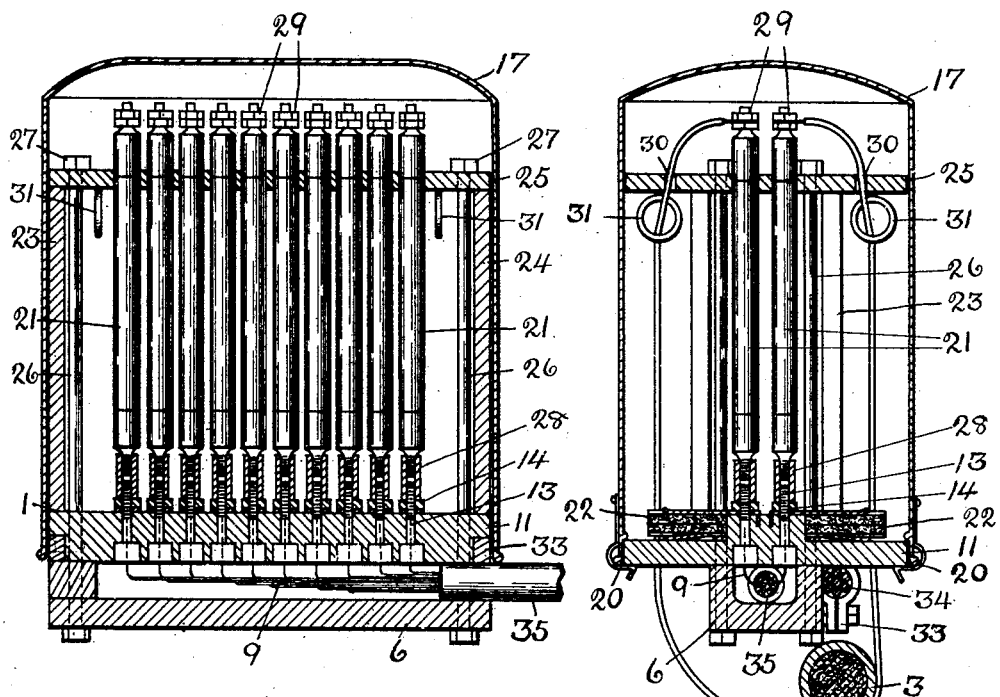
Fig. 12.
Fig. 13.
WITNESSES:
John E. Heller,
Minnie C. Rollivage.
INVENTORS.
Robert S. Donaldson,
BY Vincent E. Furnas,
Abraham Knobel, ATTORNEY.
THE NORRIS PETERS CO., WASHINGTON, D. C.

UNITED STATES PATENT OFFICE.

ROBERT S. DONALDSON AND VINCENT E. FURNAS, OF LOUISVILLE, KENTUCKY, ASSIGNORS TO FURNAS, BROWN & PLUMMER, OF LOUISVILLE, KENTUCKY, A CO-PARTNERSHIP.

SLEEVE CABLE-TERMINAL.

970,194.  Specification of Letters Patent.  Patented Sept. 13, 1910.

Application filed August 3, 1908. Serial No. 446,755.

*To all whom it may concern:*

Be it known that we, ROBERT S. DONALDSON and VINCENT E. FURNAS, citizens of the United States, residing at Louisville, in the county of Jefferson and State of Kentucky, have invented a new and useful Sleeve Cable-Terminal, of which the following is a specification.

This invention relates to cable terminal apparatus in telephone and telegraph practice.

The method of terminating cable pairs now in common use is, to lead a branch cable from a main cable to a pole, by means of a branch sleeve and Y joint, ending the branch cable in a pothead, and extending rubber covered wires from the pothead to clips inclosed in a wood box or in a terminal device covered by a vertically slidable hood commonly known as a can top, on the pole.

Our improvement allows the cable pairs to terminate in connectors on a lead sleeve or a terminal box located on the cable itself, the connectors being protected by an adjustable cover, and dispenses with the branch sleeve, the Y joint, the piece of branch cable, and the cable box or the can-top terminal now in common use. Each of these items is a source of trouble. The Y joint is more difficult to wipe than a straight one; the branch cable, being small and curved up the pole, is liable to injury by being pierced at the loop or curved portion by static discharges, and is often crystallized from vibration and consequently cracks, admitting moisture to the paper-insulated cable pairs; and the box requires frequent attention to keep it in proper operative condition.

Some of the objects of our improvement are to overcome all the difficulties suggested, to save labor, material, and expense, and to dispense with considerable complicated apparatus heretofore used. These objects we attain by means of the apparatus illustrated in the accompanying drawings, in which—

Figure 7:
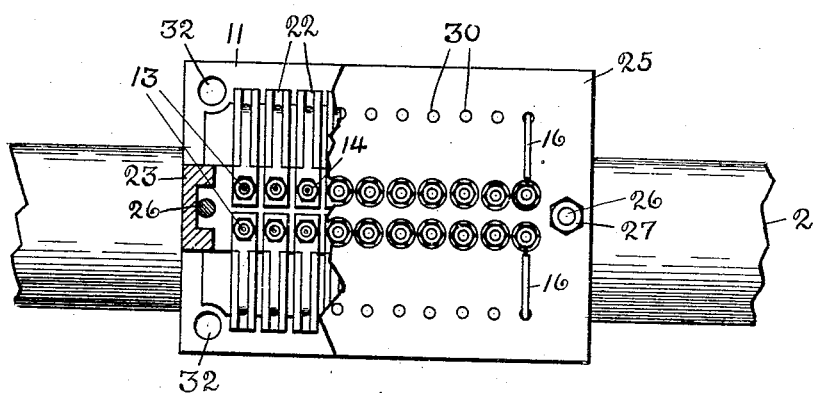

Figure 1 is a perspective view with the cover removed; Fig. 2, a vertical longitudinal section; Fig. 3, a vertical transverse section on the line A—B of Fig. 2; Fig. 4, a partial top plan view; Fig. 5, a perspective view of a part of the sleeve and box, showing the sleeve split; Fig. 6, a perspective view of the device adapted for fuses; Fig. 7, a top plan view of the same, parts being broken away; Fig. 8, a vertical longitudinal sectional view of the same; Fig. 9, a vertical transverse sectional view of the same; Fig. 10, a central longitudinal sectional view of a hollow connector; Fig. 11, a top plan view of a modification separate from the sleeve; Fig. 12, a vertical longitudinal section of the modification; and Fig. 13 is a vertical transverse section of the modification.

Similar reference numerals refer to similar parts throughout the several views of the drawings.

The terminal apparatus, 1, placed upon, or in proximity to the well-known sleeve, 2, constitutes the body of our invention. The sleeve 2, as is well known, is an enlargement of, and continuous with the cable, 3, and is placed upon the cable where certain pairs of conductors terminate and are connected with bridle or line wires. The present practice is to take a piece of cable smaller than the main cable and use it as a branch cable, strip the lead armor from one end, pass its conductors through a hole formed in one end of the sleeve and connect them with the cable conductors required within the sleeve, and join the branch cable with the sleeve by a wiped Y joint. The branch cable is then led to a pole, up the pole, and the conductors of the branch cable are then distributed from terminal apparatus placed upon the pole, in the vicinity of the sleeve. The sleeve 2 is hermetically sealed upon the cable 3 by a wiped joint at each end. The sleeve is usually split longitudinally on its lower surface, and finally soldered up, so that it is hermetically sealed throughout, preventing access of air and moisture to the paper-insulated conductors inside.

In the preferable construction of our apparatus, we use a sleeve 2 (Fig. 5) slit near the top, at 4, so as to give the splicer free access to the cable wires, and to facilitate soldering up the slit after the connections of tap or extension wires, 9, with the cable conductors have been completed. We provide the sleeve 2, on its upper side, with orifices, 5, and surround these orifices with walls forming a box, 6. The box 6 is preferably made integral with sleeve 2, or it may be soldered thereto. The orifices, 5 are provided with insulating-bushings, 7, which, in turn, are provided with axial orifices, 8, through which wires 9 may pass with a snug fit. The wires 9 are tapped onto the cable conductors and are sufficiently long to extend somewhat beyond bushings 7. When wires 9 are in place in the orifices 8, the box 6 is filled with melted insulating-compound, 10, which is flowed around the protruding wires, till the upper surface of the compound is flush with the wall of box 6. A plate, 11, of maple wood or other insulating material, is then secured over the whole by means of screws, 12, or by other convenient means. The plate 11 is provided with tubular connectors, 13, which are passed through orifices formed therefor in plate 11, the heads of the connectors being underneath, and the connectors being secured by means of nuts, 14, on the upper surface of plate 11. Additional nuts, 15, are provided on the connectors, so that bridle or line wires, 16, may be secured between nuts 14 and nuts 15. The tap or extension wires 9 pass through the tubular connectors 13 and their ends are nipped off flush with the top of the connectors and secured in the connectors by soldering. In this way the orifices for the wires 9 are closed and hermetically sealed against access of air or moisture to the inside of the sleeve. The connectors 13, on the top of plate 11, as well as the entire plate 11, are covered by an inverted box or can, 17, placed thereover and forming a protecting cap therefor. The edges of plate 11 are preferably provided with holes, 18, through which the wires 16 may pass downward (Fig. 1). The connectors 13 are preferably arranged in parallel rows on plate 11, and the members of the pairs of wires are connected with connectors opposite each other. The bridle wires 16 are then connected to corresponding connectors 13, and led through holes 18 on opposite sides of plate 11, and downward on opposite sides of sleeve 2, then brought together beneath the sleeve, and passed through a bridle ring, 19 suspended from cable 3, whence they are distributed to the neighboring instruments. The cover 17 may be provided with springs, 20, on its edges, to hold it securely upon the terminal apparatus and prevent its being blown off by wind or accidentally removed by other causes. It will be understood that thus arranged, the cover 17 prevents access of water to the terminal connections upon plate 11, and is readily removable by linemen in order to make connections.
In the modification shown in Fig. 6, provision is made for the application of fuses, 21, and the usual carbon lightning protectors, 22. For this purpose uprights, 23 and 24, are erected upon plate 11, and an additional plate, 25, is secured upon said uprights by means of bolts, 26, and nuts, 27. The fuses 21 are provided with threaded sockets, 28, which are screwed down upon the connectors 13, and at their opposite ends are provided with threaded shanks and nuts, 29, for securing the bridle wires 16. In this modification, the upper plate 25 is provided along its edges with holes, 30, to accommodate the bridle wires which, after passing through the holes, are brought together and passed through bridle rings, 31, provided at the corners of plate 25. Thence the bridle wires pass downward through holes, 32, provided in the corners of the lower plate 11. This entire terminal apparatus is then covered for protection from moisture by the inverted can or cap 17, formed sufficiently deep to cover the whole.

In the modification shown in Figs. 11, 12, and 13, the box 6 is not placed upon the sleeve 2, but is provided with a clamp, 33, by means of which it is secured on the messenger wire or rope, 34, in immediate proximity to the sleeve 2, and connected with the sleeve by means of a short branch cable, 35, which is hermetically sealed on sleeve 2, and in box 6. Otherwise the terminal apparatus in this modification is constructed in the same manner as just described.

Having thus described our invention, so that any one skilled in the art pertaining thereto may practice it, we claim—

1. In a distributing terminal for telephone cables, the common lead sleeve applied with wiped joints and provided with an integral receptacle, fusible insulating compound in said receptacle, wires extending from the cable within said sleeve, said sleeve being provided with orifices in its wall in the bottom of said receptacle for the exit of said wires from the cable, a cover for said receptacle, hollow screws secured in said cover, means provided on said screws to make connections, and the terminal wires from the cable being soldered in the upper end of said screws.

2. In a distributing terminal for cables, the common lead sleeve, provided on the outside of its wall with an integral receptacle, in said receptacle fusible compound, wires of the cable cut and extended, said sleeve being provided with orifices in its wall in the bottom of said receptacle for the exit of said wires from the cable, a cover for said receptacle, having its sides extending beyond the wall of said receptacle, and provided with holes to receive bridle wires, hollow screws secured in said cover, means provided on said screws to make connections, and said wires from the cable being soldered in the upper end of said screws.

3. In a distributing terminal for telephone cables, the common lead sleeve applied with wiped joints, said sleeve provided with an integral receptacle, fusible insulating compound in said receptacle, said sleeve being provided with orifices in its wall in the bottom of said receptacle for the exit of wires from the cable, wires from the cable cut and extended, fusible insulating compound around the wires from the cable where they pass through said orifices in said sleeve in the bottom of said receptacle, a cover for said receptacle, hollow screws secured in said cover, means provided on said screws to make connections of bridle wires, and said wires from the cable being soldered in the upper end of said screws.

4. In a distributing terminal for telephone cables, the common lead sleeve applied with wiped joints, said sleeve provided with an integral receptacle for fusible insulating compound, fusible insulating compound in said receptacle, said sleeve being provided with orifices in its wall in the bottom of said receptacle for the exit of wires from the cable, wires extending from the cable, said fusible insulating compound being placed around the wires from the cable where they pass through said receptacle, a cover for said receptacle, hollow screws secured in said cover, means provided on said screws to make connections of bridle wires, said wires from the cable being soldered in the upper end of said screws, and an inverted can-top cover on said receptacle.

ROBERT S. DONALDSON.
VINCENT E. FURNAS.

Witnesses:
CHARLES E. ARCHER,
RAY C. BUTTMAN.